US012375955B2

United States Patent
Xue et al.

(10) Patent No.: US 12,375,955 B2
(45) Date of Patent: Jul. 29, 2025

(54) METHOD FOR INDICATING TO SKIP PDCCH MONITORING AND APPARATUS

(71) Applicant: HUAWEI TECHNOLOGIES CO., LTD., Guangdong (CN)

(72) Inventors: Yifan Xue, Shenzhen (CN); Xiaolei Tie, Shanghai (CN); Lixia Xue, Shanghai (CN); Zhanzhan Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 326 days.

(21) Appl. No.: 17/870,636

(22) Filed: Jul. 21, 2022

(65) Prior Publication Data

US 2022/0361024 A1 Nov. 10, 2022

Related U.S. Application Data

(63) Continuation of application No. PCT/CN2020/124456, filed on Oct. 28, 2020.

(30) Foreign Application Priority Data

Jan. 22, 2020 (CN) .................. 202010075343.X

(51) Int. Cl.
*H04W 24/08* (2009.01)
*H04L 1/1812* (2023.01)
(Continued)

(52) U.S. Cl.
CPC ........... *H04W 24/08* (2013.01); *H04L 1/1812* (2013.01); *H04W 72/0446* (2013.01); *H04W 72/0453* (2013.01); *H04W 72/23* (2023.01)

(58) Field of Classification Search
CPC ............. H04W 72/23; H04W 52/0235; H04W 52/0216; H04W 52/0229; H04L 5/0094; H04L 5/0053; H04L 5/005; H04L 5/0007
See application file for complete search history.

(56) References Cited

U.S. PATENT DOCUMENTS

2019/0253308 A1* 8/2019 Huang ................ H04L 43/0823
2019/0297577 A1* 9/2019 Lin .................... H04W 52/0235
(Continued)

FOREIGN PATENT DOCUMENTS

| WO | 2019196663 A1 | 10/2019 |
| WO | 2019214734 A1 | 11/2019 |

OTHER PUBLICATIONS

R1-1910079, Huawei et al., Other considerations on UE power saving, 3GPP TSG RAN WG1 Meeting #98bis, Chongqing, China, Oct. 14-20, 2019, 10 pages.
(Continued)

*Primary Examiner* — Mahran Y Abu Roumi
(74) *Attorney, Agent, or Firm* — WOMBLE BOND DICKINSON (US) LLP

(57) ABSTRACT

A method for indicating to skip PDCCH monitoring and an apparatus are provided, to indicate, by using downlink control information, a terminal device to skip PDCCH monitoring. After a network device sends DCI that includes PDCCH skipping indication information to the terminal device, the terminal device determines, based on the PDCCH skipping indication information, not to monitor a PDCCH in a first time interval. In this way, the DCI is used to indicate the terminal device to skip PDCCH monitoring, and specific signaling used to indicate to skip PDCCH monitoring is clarified, thereby saving energy of the terminal device.

17 Claims, 10 Drawing Sheets

(51) Int. Cl.
   *H04W 72/0446*   (2023.01)
   *H04W 72/0453*   (2023.01)
   *H04W 72/23*     (2023.01)

(56) References Cited

U.S. PATENT DOCUMENTS

2022/0061033 A1* 2/2022 Lin .................. H04L 5/0053
2023/0131118 A1* 4/2023 Kim ................ H04W 52/0216
                                                              370/311

OTHER PUBLICATIONS

R1-1911007, Convida Wireless, On Power Savings Using PDCCH Skipping, 3GPP TSG-RAN WG1 #98bis, Chongqing, China, Oct. 14 20, 2019, 5 pages.

R1-1911945, Ericsson, PDCCH Enhancements for NR URLLC, 3GPP TSG-RAN WG1 Meeting #99, Reno, USA, Nov. 18 22, 2019, 24 pages.

R1-1912980, Qualcomm Incorporated, SCell Dormancy and Fast SCell Activation, 3GPP TSG-RAN WG1 #99, Reno, USA, Nov. 18 22, 2019, 13 pages.

LG Electronics Inc: "DCI-based PDCCH skipping impacts on MAC", 3GPP Draft: R2-1907662 DCI-Based PDCCH Skipping Impacts on MAC, 3rd Generation Partnership Project (3GPP), Mobile Competence Centre; 650, Route Des Lucioles; F-06921 Sophia-Antipolis Cedex; France, vol. RAN WG2, No. Reno, U.S.A; May 13, 2019, XP051731096, total 2 pages.

Huawei et al: "Power saving schemes", 3GPP Draft; R1-1900040, 3rd Generation Partnership Project (3GPP), Mobile Competence Centre; 650, Route Des Lucioles; F-06921 Sophia-Antipolis Cedex; France, vol. RAN WG1, No. Taipei; Jan. 12, 2019, XP051575666, total 13 pages.

\* cited by examiner

METHOD FOR INDICATING TO SKIP PDCCH MONITORING AND APPARATUS

CROSS-REFERENCE TO RELATED APPLICATIONS

This application is a continuation of International Application No. PCT/CN2020/124456, filed on Oct. 28, 2020, which claims priority to Chinese Patent Application No. 202010075343.X, filed on Jan. 22, 2020. The disclosures of the aforementioned applications are hereby incorporated by reference in their entireties.

TECHNICAL FIELD

This application relates to the field of communications technologies, and in particular, to a method for indicating to skip physical downlink control channel (PDCCH) monitoring and an apparatus.

BACKGROUND

Currently, study on power saving of a terminal device is increasingly common. In a study and discussion process, to save energy of the terminal device, an idea of PDCCH skipping is proposed, so that the terminal device does not need to monitor a PDCCH in a period of time. However, the foregoing manner of indicating PDCCH skipping is not discussed currently.

SUMMARY

This application provides a method for indicating to skip PDCCH monitoring and an apparatus, to indicate, by using downlink control information (DCI), a terminal device to skip PDCCH monitoring.

According to a first aspect, this application provides a method for indicating to skip PDCCH monitoring. A network device generates downlink control information (DCI), and sends the DCI to a terminal device, where a specific field in the DCI includes PDCCH skipping indication information, and the PDCCH skipping indication information indicates the terminal device not to monitor a PDCCH in a first time interval. The terminal device determines, based on the PDCCH skipping indication information, not to monitor the PDCCH in the first time interval.

According to the foregoing method, the DCI is used to indicate the terminal device to skip PDCCH monitoring, and specific signaling used to indicate to skip PDCCH monitoring is clarified, thereby saving energy of the terminal device.

In an embodiment, the specific field in the DCI includes at least one of fields other than a frequency domain resource allocation (FDRA) field and a first-type field in the DCI. The first-type field is a defined field that indicates a dormancy behavior of the terminal device on a secondary cell, and the first-type field includes at least one of the following fields: a modulation and coding scheme (MCS) of a transport block (TB) 1, a new data indicator (NDI) of the TB 1, a redundancy version (RV) of the TB 1, a hybrid automatic repeat request (HARQ) process number (HPN), an antenna port, or demodulation reference signal (DMRS) sequence initialization.

According to the foregoing method, one piece of DCI may be used to simultaneously indicate the dormancy behavior of the terminal device and PDCCH monitoring skipping, so that PDCCH monitoring skipping is indicated while signaling overheads are reduced.

In an embodiment, the specific field in the DCI includes at least one of the following fields: a transmit power control (TPC) command, a physical uplink control channel (PUCCH) resource indicator, a sounding reference signal (SRS) request, time domain resource allocation (TDRA), a carrier indicator field (CIF), a BWP (bandwidth part) indicator, virtual resource block (VRB)-to-physical resource block (PRB) mapping, a PRB bundling size indicator, a rate matching indicator, a zero power channel state information-reference signal (ZP CSI-RS) trigger, an MCS, an NDI, and an RV that are of a TB 2, a downlink assignment index (DAI), a physical downlink shared channel (PDSCH)-to-HARQ feedback timing indicator, a transmission configuration indicator (TCI), code block group transmission information (CBGTI), or code block group flushing out information (CBGFI). In this way, the DCI may be used to indicate PDCCH monitoring skipping.

In an embodiment, the DCI further includes a flag bit. When the flag bit has a first value, the specific field in the DCI indicates the PDCCH skipping indication information. The flag bit is located in a field other than an FDRA field in the DCI. The specific field includes at least one of first-type fields in the DCI, and the first-type field includes at least one of the following fields: an MCS of a TB 1, an NDI of the TB 1, an RV of the TB 1, an HPN, an antenna port, or DMRS sequence initialization; or the specific field includes at least one field other than the FDRA field in the DCI.

According to the foregoing method, a first bit may be used to indicate that the DCI indicates not to monitor a PDCCH, and a requirement in a case in which the PDCCH skipping indication information requires a relatively large number of bits may be further met.

In an embodiment, carrier aggregation CA is not configured for the terminal device. The specific field includes at least one of first-type fields in the DCI, and the first-type field includes at least one of the following fields: an MCS of a TB 1, an NDI of the TB 1, an RV of the TB 1, an HPN, an antenna port, or DMRS sequence initialization; or the specific field includes at least one field other than an FDRA field in the DCI.

According to the foregoing method, the DCI may be used to indicate the terminal device to skip PDCCH monitoring, and a requirement in a case in which the PDCCH skipping indication information requires a relatively large number of bits may be further met.

In an embodiment, the specific field includes an idle field in a first-type field. The first-type field is a defined field that indicates a dormancy behavior of the terminal device on a secondary cell, and a non-idle field in the first-type field includes indication information that indicates the dormancy behavior of the terminal device on the secondary cell. The first-type field includes at least one of the following fields: an MCS of a TB 1, an NDI of the TB 1, an RV of the TB 1, an HPN, an antenna port, or DMRS sequence initialization.

According to the foregoing method, a redundant bit of a dormancy behavior indication may be fully used at the same time, and same DCI may be used to simultaneously indicate the dormancy behavior and the PDCCH skipping indication information.

In an embodiment, the PDCCH skipping indication information includes at least one of the following information: the first time interval in which the PDCCH is skipped, frequency domain resource information of some or all PDCCHs that are not monitored, radio network temporary identifier RNTI information of some or all PDCCHs that are not monitored, formats of some or all PDCCHs that are not monitored, or searching space of some or all PDCCHs that are not monitored. In this way, when the terminal device does not monitor the PDCCH in the first time interval based on the PDCCH skipping indication information, the terminal device better knows how to skip the PDCCH.

In an embodiment, the frequency domain resource information of some or all PDCCHs that are not monitored includes: a primary cell on which some or all PDCCHs are not monitored, or a primary cell and a secondary cell on which some or all PDCCHs are not monitored.

In an embodiment, the frequency domain resource information of some or all PDCCHs that are not monitored includes the primary cell and the secondary cell on which some or all PDCCHs are not monitored, the PDCCH skipping indication information includes a plurality of bits, and the plurality of bits indicate the primary cell and the secondary cell on which some or all PDCCHs are not monitored. The plurality of bits include a first bit and a second bit, the first bit indicates a first cell or a first cell group on which some or all PDCCHs are not monitored, and the second bit indicates a second cell or a second cell group on which some or all PDCCHs are not monitored. In this way, some or all PDCCHs may be not monitored on the primary cell and the secondary cell.

In an embodiment, the FDRA field in the DCI is preset to a specific value. When an FDRA type is a type 0, the specific value is a first value; or when the frequency domain resource allocation type is a type 1, the specific value is a second value. In this way, the FDRA field may be used to identify that the DCI is signaling with which function.

In an embodiment, the first value is all zeros, and the second value is all ones.

According to a second aspect, this application further provides an apparatus. The apparatus may be a first device, and the first device may be a terminal device. The apparatus has a function of implementing the terminal device in the first aspect or each possible design example of the first aspect. The function may be implemented by hardware, or may be implemented by hardware executing corresponding software. The hardware or the software includes one or more modules corresponding to the foregoing function.

In an embodiment, a structure of the apparatus includes a transceiver unit and a processing unit, and the units may perform corresponding functions of the terminal device in the first aspect or each possible design example of the first aspect. For details, refer to detailed descriptions in the method example. The details are not described herein again.

In an embodiment, a structure of the apparatus includes a transceiver and a processor, and optionally, further includes a memory. The transceiver is configured to receive and transmit data and communicate and interact with another device in a communications system. The processor is configured to support the apparatus in performing corresponding functions of the terminal device in the first aspect or each possible design example of the first aspect. The memory is coupled to the processor, and stores program instructions and data that are necessary for the apparatus.

According to a third aspect, this application further provides an apparatus. The apparatus may be a second device, and the second device may be a network device. The apparatus has a function of implementing the network device in the first aspect or each possible design example of the first aspect. The function may be implemented by hardware, or may be implemented by hardware executing corresponding software. The hardware or the software includes one or more modules corresponding to the foregoing function.

In an embodiment, a structure of the apparatus includes a transceiver unit and a processing unit, and the units may perform corresponding functions of the network device in the first aspect or each possible design example of the first aspect. For details, refer to detailed descriptions in the method example. The details are not described herein again.

In an embodiment, a structure of the apparatus includes a transceiver and a processor, and optionally, further includes a memory. The transceiver is configured to receive and transmit data and communicate and interact with another device in a communications system. The processor is configured to support the apparatus in performing corresponding functions of the network device in the first aspect or each possible design example of the first aspect. The memory is coupled to the processor, and stores program instructions and data that are necessary for the apparatus.

According to a fourth aspect, an embodiment of this application provides a communications system, which may include the terminal device and the network device that are mentioned above.

According to a fifth aspect, an embodiment of this application provides a computer-readable storage medium. The computer-readable storage medium stores program instructions, and when the program instructions are run on a computer, the computer is enabled to perform the first aspect of embodiments of this application and any possible design of the first aspect. For example, the computer-readable storage medium may be any available medium that can be accessed by the computer. This is used as an example but is not limited to the following: The computer-readable medium may include a non-transient computer-readable medium, a random access memory (RAM), a read-only memory (ROM), an electrically erasable programmable read-only memory (EEPROM), a CD-ROM or another optical disk storage, a magnetic disk storage medium or another magnetic storage device, or any other medium that can be configured to carry or store expected program code in a form of an instruction or a data structure and that can be accessed by a computer.

According to a sixth aspect, an embodiment of this application provides a computer program product that includes computer program code or instructions. When the computer program product is run on a computer, the computer is enabled to implement the method in any of the foregoing aspects.

According to a seventh aspect, this application further provides a chip. The chip is coupled to a memory and is configured to read and execute program instructions stored in the memory, to implement any of the foregoing methods.

DESCRIPTION OF EMBODIMENTS

The following further describes in detail this application with reference to accompanying drawings.

Embodiments of this application provide a method for indicating to skip PDCCH monitoring and an apparatus, to indicate, by using downlink control information (DCI), a terminal device to skip PDCCH monitoring. The method and the apparatus in this application are based on a same inventive concept. Because the method and the apparatus have similar problem resolving principles, for implementation of the apparatus and implementation of the method, refer to each other. Repeated parts are not described.

In descriptions of this application, terms such as "first" and "second" are merely used for differentiation and description, but should not be understood as an indication or implication of relative importance or an indication or implication of an order.

In the description in this application, "at least one (type)" refers to one or more (types), and "a plurality of (types)" refers to two or more (types).

To describe the technical solutions in embodiments of this application more clearly, the method for indicating to skip PDCCH monitoring and the apparatus provided in embodiments of this application are described below in detail with reference to the accompanying drawings.

Figure 1:
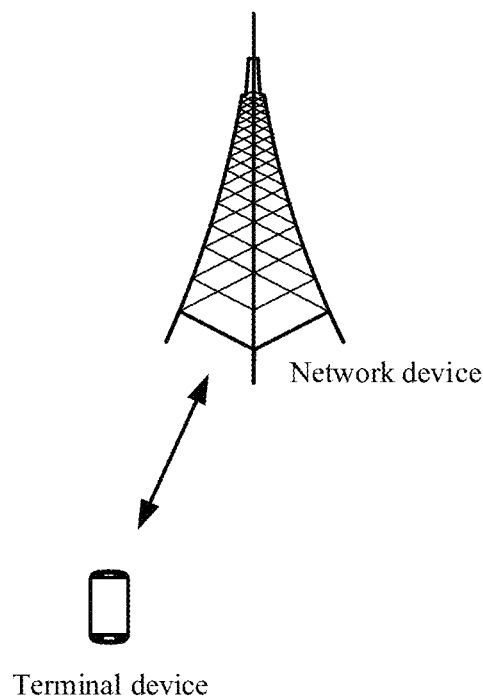
FIG. 1 is a schematic diagram of a structure of a communications system according to this application.

FIG. 1 shows an architecture of a possible communications system to which the method for indicating to skip PDCCH monitoring provided in embodiments of this application is applicable. The architecture of the communications system includes a network device and a terminal device.

The network device is a device with a wireless receiving/transmission function or a chip that can be disposed in the network device. The network device includes but is not limited to a gNB, a radio network controller (RNC), a NodeB (NB), a base station controller (BSC), a base transceiver station (BTS), a home base station (for example, a home evolved NodeB, or a home NodeB, HNB), a baseband unit (BBU), an access point (AP), a radio relay node, a radio backhaul node, or a transmission point (transmission and reception point (TRP), or TP) that is in a wireless fidelity (Wi-Fi) system, or the like; or may be a network node that forms a gNB or a transmission point, such as a baseband unit (BBU) or a distributed unit (DU).

In some deployments, a gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or may be converted from information at the PHY layer. Therefore, in this architecture, higher layer signaling such as RRC layer signaling or PHCP layer signaling may also be considered as being sent by the DU or being sent by the DU and the RU. It may be understood that the network device may be a CU node, a DU node, or a device including a CU node and a DU node. In addition, the CU may be classified into a network device in an access network RAN, or the CU may be classified into a network device in a core network CN. This is not limited.

The terminal device may also be referred to as user equipment (UE), an access terminal, a subscriber unit, a subscriber station, a mobile station, a remote station, a remote terminal, a mobile device, a user terminal, a terminal, a wireless communications device, a user agent, a user apparatus, or the like. The terminal device in embodiments of this application may be a mobile phone, a tablet computer (Pad), a computer with a wireless receiving/transmission function, a virtual reality (VR) terminal device, an augmented reality (AR) terminal device, a wireless terminal in industrial control, a wireless terminal in self-driving, a wireless terminal in remote medical, a wireless terminal in a smart grid (smart grid), a wireless terminal in transportation safety, a wireless terminal in a smart city, a wireless terminal in a smart home, or the like. Application scenarios are not limited in embodiments of this application. In this application, a terminal device with a wireless receiving/transmission function and a chip that can be disposed in the terminal device are collectively referred to as a terminal device.

It should be noted that the communications system shown in FIG. 1 may be but is not limited to a fifth-generation (5G) system, such as a new radio access technology (NR). Optionally, the method in embodiments of this application is further applicable to various future communications systems, such as a 6G system or another communications network.

Currently, carrier aggregation (CA) is introduced into a standard. A plurality of component carriers (CC) may be configured for one terminal device. One of the CCs corresponds to a primary cell (PCell), which is a cell on which the terminal device performs initial connection establishment, a cell on which the terminal device performs radio resource control (RRC) connection re-establishment, or a primary cell specified in a handover process. The PCell is responsible for RRC communication with the terminal device. Physical uplink control channel (PUCCH) information can be sent on only the PCell. A remaining CC corresponds to a secondary cell (SCell).

When CA is configured for the terminal device, the network device may indicate, on the PCell, whether the terminal device performs a dormancy behavior on the SCell. If the network device indicates the terminal device to perform the dormancy behavior, the terminal device does not monitor a PDCCH on a corresponding SCell. Specifically, the dormancy behavior may be indicated by using downlink control information (DCI). During indication, a frequency domain resource allocation (FDRA) field in a DCI format 1_1 is preset to a specific value (when a frequency domain resource allocation type is a type 0, the specific value is a first value; or when the frequency domain resource allocation type is a type 1, the specific value is a second value). Specifically, the dormancy behavior may be indicated by using at least one of the following fields in the DCI: a modulation and coding scheme (MCS) of a transport block (TB) 1, a new data indicator (NDI) of the TB 1, a redundancy version (RV) of the TB 1, a hybrid automatic repeat request process number HARQ HPN), an antenna port, or demodulation reference signal sequence initialization (DMRS sequence initialization). The foregoing fields have at least 15 bits, and may correspondingly indicate the dormancy behavior on a maximum of 15 SCells. For example, a bit '0' may indicate that the terminal device performs the dormancy behavior on a corresponding SCell, and '1' may indicate that the terminal device performs a non-dormancy behavior on a corresponding SCell.

For example, the first value may be all zeros. To be specific, when the frequency domain resource allocation type is the type 0, the DCI indicates the dormancy behavior only when the FDRA field is all zeros; or when the FDRA field is not all zeros, the DCI indicates data scheduling. The second value may be all ones. Similarly, when the frequency domain resource allocation type is the type 1, the DCI indicates the dormancy behavior only when the FDRA field is all ones; or when the FDRA field is not all ones, the DCI indicates data scheduling. It should be noted that in specific implementation, the first value may be defined as another value, and the second value may be defined as another value. This is not limited in this application.

Specifically, the dormancy behavior means that a dormant bandwidth part (dormant BWP) is configured on the SCell of the terminal device, and the terminal device hands over between the dormant BWP and a non-dormant BWP on the SCell.

Power saving of the terminal device may be implemented based on an indication of the dormancy behavior. Currently, in a process of studying and discussing power saving of the terminal device, an idea of PDCCH skipping is proposed, and it is intended that the network device sends signaling to indicate that the terminal device may not need to monitor a PDCCH in a period of time (for example, several slots, several subframes, several milliseconds, or several PDCCH monitoring occasions). However, specific signaling used for indication is not determined in a current standard or protocol. Therefore, this idea is not supported and cannot be implemented. Based on this, this application proposes a method for indicating to skip PDCCH monitoring, to indicate, by using downlink control information (DCI), a terminal device to skip PDCCH monitoring, to clarify specific signaling used to indicate to skip PDCCH monitoring, thereby saving energy of the terminal device.

It should be noted that, the dormancy behavior means that the terminal device keeps dormant when dormancy is indicated, that is, the terminal device does not monitor the PDCCH until the terminal device receives a PDCCH monitoring indication. However, PDCCH skipping in embodiments of this application means that the PDCCH is not monitored in a period of time, and the PDCCH automatically starts to be monitored when the period of time ends.

Specifically, when the network device predicts that the network device does not schedule a terminal device in a later period of time, the network device may send a corresponding PDCCH skipping indication to the terminal device, for example, when a current cache of the network device has no data to be sent by the terminal device, and the network device determines to schedule only another terminal device rather than the terminal device in the later period of time.

It should be noted that in embodiments of this application, a first device may skip a PDCCH, and a second device may indicate the first device to skip the PDCCH. Specifically, the first device may be a terminal device, a processor in the terminal device, a chip or a chip system, a functional module, or the like. The second device may be a network device, a processor in the network device, a chip or a chip system, a functional module, or the like. In the following embodiments, the method for indicating to skip PDCCH monitoring provided in this application is described in detail by using only an example in which the first device is the terminal device and the second device is the network device. However, this application is not limited thereto.

Figure 2:
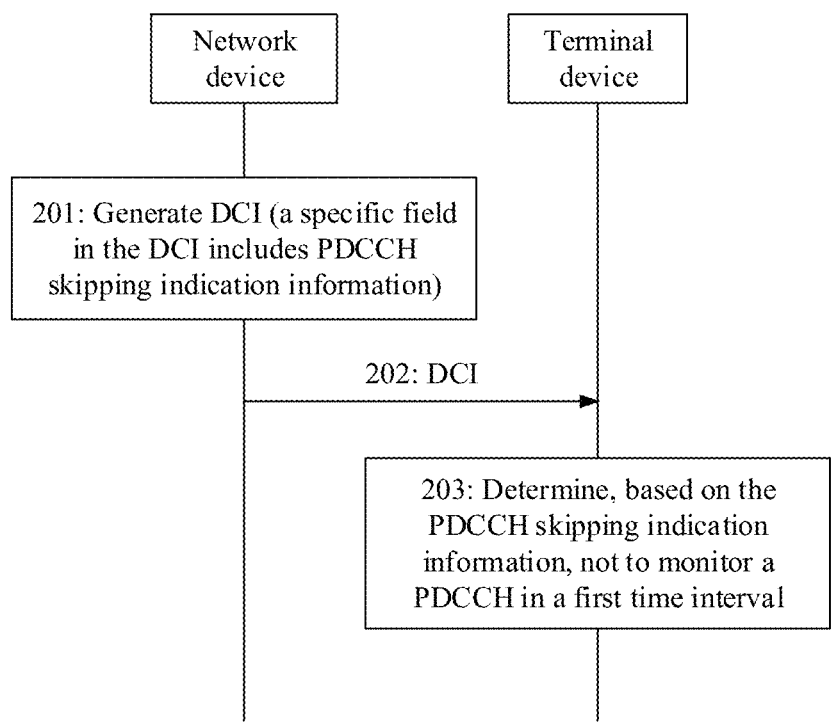
FIG. 2 is a flowchart of a method for indicating to skip PDCCH monitoring according to this application.

A method for indicating to skip PDCCH monitoring provided in embodiments of this application is applicable to the communications system shown in FIG. 1. As shown in FIG. 2, a specific procedure of the method may include the following operations.

Operation 201: A network device generates DCI, where a specific field in the DCI includes PDCCH skipping indication information, and the PDCCH skipping indication information indicates a terminal device not to monitor a PDCCH in a first time interval.

Specifically, when the DCI is configured to have a function of indicating to skip PDCCH monitoring, an FDRA field in the DCI is preset to a specific value. When a frequency domain resource allocation type is a type 0, the specific value is a first value; or when the frequency domain resource allocation type is a type 1, the specific value is a second value. In an example, the first value may be all zeros, and the second value may be all ones. It should be noted that in specific implementation, the first value may be defined as another value, and the second value may be defined as another value. This is not limited in this application.

For example, when the frequency domain resource allocation type is the type 0, each bit of the FDRA field in the DCI indicates, in a one-to-one correspondence manner by using a bitmap, whether each resource block group (RBG) is used to transmit scheduled data. When a bit value is '1', it indicates that a corresponding RBG is used for data transmission; or when a value is '0', it indicates that a corresponding RBG is not used for data transmission. Therefore, when the frequency domain resource allocation type is the type 0 and the FDRA field is all zeros, the DCI schedules no frequency domain resource, and therefore cannot be used for data scheduling.

When the frequency domain resource allocation type is the type 1, the FDRA field in DCI indicates a resource indication value (resource indication value, RIV), and indicates, through coding, a start location and a length of an RB used for data transmission. When $RB_{start}$ is the start location of the RB and $L_{RBs}$ is the length of the RB (that is, a number of RBs), a value of the RIV may be calculated by using the following formula:

if (if) $(L_{RBs}-1) \leq \lfloor N_{BWP}^{size}/2 \rfloor$, then (then):

$RIV=N_{BWP}^{size}(L_{RBs}-1)+RB_{start}$, else (else):

$RIV=N_{BWP}^{size}(N_{BWP}^{size}-L_{RBs}+1)+(N_{BWP}^{size}-1-RB_{start})$, where $N_{BWP}^{size}$ is a length of a BWP.

Based on the formula, when the frequency domain resource allocation type is the type 1 and the FDRA field is all ones, the DCI schedules no frequency domain resource, and therefore cannot be used for data scheduling.

In conclusion, when the frequency domain resource allocation type is the type 0, the FDRA field is all zeros; or when the frequency domain resource allocation type is the type 1, the FDRA field is all ones. Data cannot be scheduled for transmission in both of the cases. In this case, the DCI may be used to indicate other information in the special cases.

Figure 3:
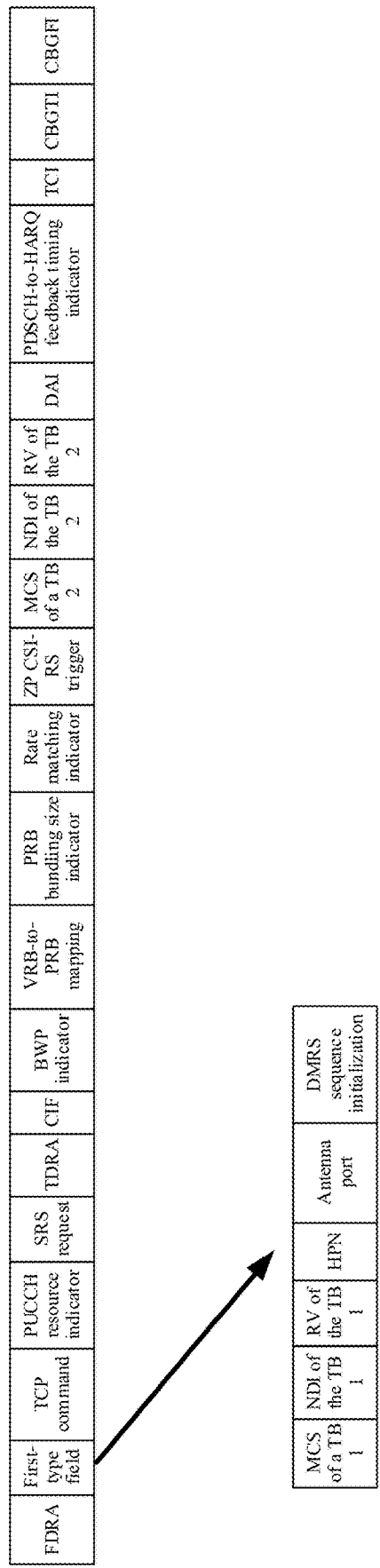
FIG. 3 is a schematic diagram of a type of DCI according to this application.

Fields included in currently used DCI may be shown in FIG. 3, and include an FDRA field, a first-type field, and the following fields: a transmit power control (TPC) command, a physical uplink control channel (PUCCH) resource indicator, a sounding reference signal (SRS) request, time domain resource allocation (TDRA), a carrier indicator field (CIF), a BWP indicator, virtual resource block (VRB)-to-physical resource block (PRB) mapping, a PRB bundling size indicator, a rate matching indicator, a zero power channel state information-reference signal (ZP CSI-RS) trigger, an MCS of a TB 2, an NDI of the TB 2, an RV of the TB 2, a downlink assignment index (DAI), a physical downlink shared channel (PDSCH)-to-HARQ feedback timing indicator, a transmission configuration indicator (TCI), code block group transmission information (CBGTI), or code block group flushing out information (CBGFI). The first-type field includes at least one of the following fields: an MCS of a TB 1, an NDI of the TB 1, an RV of the TB 1, an HPN, an antenna port, or DMRS sequence initialization.

In an embodiment, the specific field in the DCI may be implemented by using at least the following four methods.

Method 1: The specific field in the DCI includes at least one of fields other than an FDRA field and a first-type field in the DCI. In Method 1, the first-type field multiplexes an existing indication meaning, to be specific, the first-type field is a defined field that indicates a dormancy behavior of the terminal device on a secondary cell. For fields included in the first-type field, refer to the description in the foregoing DCI. Details are not described herein again.

To be specific, the specific field in the DCI in Method 1 may include at least one of the following fields: a TPC command, a PUCCH resource indicator, an SRS request, TDRA, a CIF, a BWP indicator, VRB-to-PRB mapping, a PRB bundling size indicator, a rate matching indicator, a ZP CSI-RS trigger, an MCS of a TB 2, an NDI of the TB 2, an RV of the TB 2, a DAI, a PDSCH-to-HARQ feedback timing indicator, TCI, CBGTI, or CBGFI.

Figure 4:
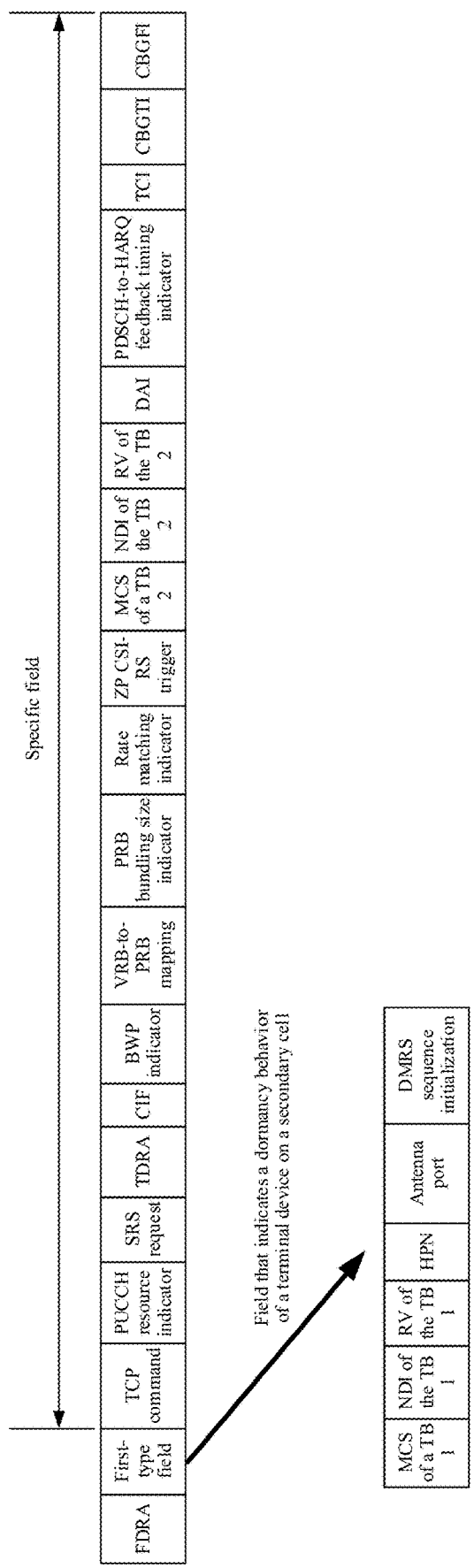
FIG. 4 is a schematic diagram of another type of DCI according to this application.

For example, when Method 1 is used for implementation, an example of the DCI may be shown in FIG. 4.

In Method 1, one piece of DCI may be used to simultaneously indicate the dormancy behavior of the terminal device and PDCCH monitoring skipping, so that PDCCH monitoring skipping is indicated while signaling overheads are reduced.

Method 2: A flag bit (flag bit) is defined in a field other than an FDRA field in the DCI. When the flag bit has different values, the DCI may have different indication functions. Specifically, when the value of the flag bit is a first value, the first value indicates that the DCI is signaling that indicates the PDCCH skipping indication information, that is, the signaling that indicates, by using the PDCCH skipping indication information, the terminal device not to monitor the PDCCH in the first time interval. In this case, the specific field may have the following two manners.

Figure 5:
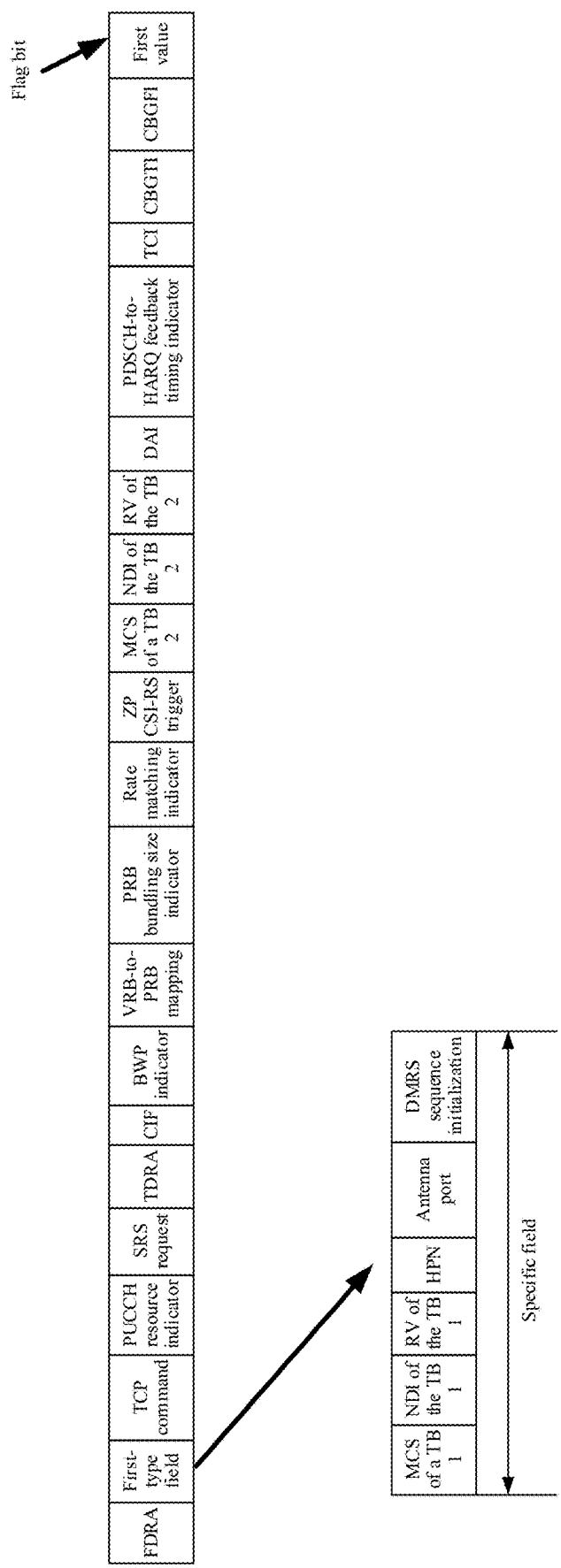
FIG. 5 is a schematic diagram of another type of DCI according to this application.

Manner 1: The specific field includes at least one of first-type fields in the DCI. For fields included in the first-type field, refer to the description of the first-type field in the foregoing DCI. The fields are not listed one by one herein. For example, when Manner 1 is used, an example of the DCI may be shown in FIG. 5.

Figure 6:
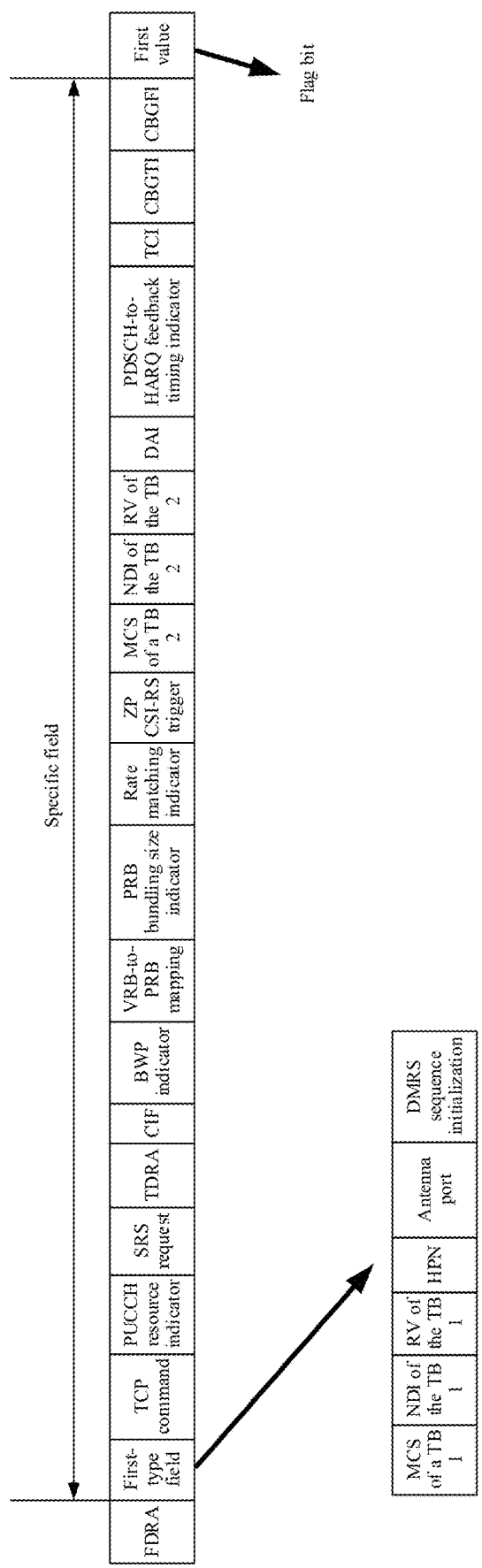
FIG. 6 is a schematic diagram of another type of DCI according to this application.

Manner 2: The specific field includes at least one field other than an FDRA field in the DCI. For example, when including at least one field other than the FDRA field in the DCI, the specific field may include a first-type field such as an MCS of a TB 1, an NDI of the TB 1, an RV of the TB 1, an HPN, an antenna port, and DMRS sequence initialization, and at least one of the following fields: a TPC command, a PUCCH resource indicator, an SRS request, TDRA, a CIF, a BWP indicator, VRB-to-PRB mapping, a PRB bundling size indicator, a rate matching indicator, a ZP CSI-RS trigger, an MCS, an NDI, and an RV that are of a TB 2, a DAI, a PDSCH-to-HARQ feedback timing indicator, TCI, CBGTI, or CBGFI. For example, when Manner 2 is used, an example of the DCI may be shown in FIG. 6.

Figure 7:
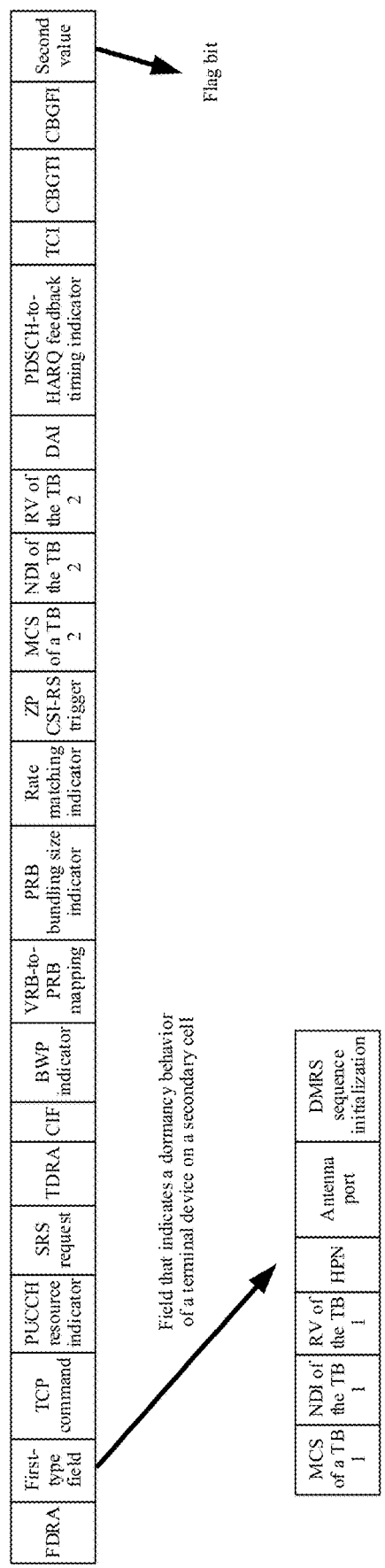
FIG. 7 is a schematic diagram of another type of DCI according to this application.

In this method, when the flag bit has a second value, the second value may indicate that the DCI is signaling that indicates a dormancy behavior of the terminal device on a secondary cell. In this case, the first-type field in the DCI multiplexes an indication meaning in the conventional technology, to be specific, the first-type field is a defined field that indicates the dormancy behavior of the terminal device on the secondary cell. For example, FIG. 7 shows an example of the DCI when the flag bit has the second value.

For example, the first value may be 1, and the second value may be 0. Certainly, the first value may be 0, and the second value may be 1. It should be understood that the first value and the second value each may be another value. This is not limited in this application.

It should be noted that in Method 2, the flag bit may be preferentially located in the last bit in the DCI. In this way, the flag bit can be easily and simply implemented, and is not affected by another previous bit.

It should be noted that a bit length of each field in the specific field in Method 1 is determined based on a configuration parameter on a network device side. Lengths of most fields may be 0, that is, the field may not exist in the DCI, and the field may optionally exist. Lengths of the fields are as follows: the TPC command (2 bits), the PUCCH resource indicator (3 bits), the SRS request (2 or (or) 3 bits), TDRA (0 to 4 bits), the CIF (0 or 3 bits), the BWP indicator (0 to 2 bits), the VRB-to-PRB mapping (0 or 1 bit), the PRB bundling size indicator (0 or 1 bit), the rate matching indicator (0 to 2 bits), the ZP CSI-RS trigger (0 to 2 bits), the MCS, the NDI, and the RV that are of the TB 2 (8 bits), the DAI (0, 2, or 4 bits), the PDSCH-to-HARQ feedback timing indicator (0 to 3 bits), the TCI (0 or 3 bits), the CBGTI (0, 2, 4, 6, or 8 bits), and the CBGFI (0 or 1 bit). Some fields may be unavailable (for example, when the dormancy behavior is indicated, in some cases, the physical uplink control channel resource indicator ((physical uplink control channel, PUCCH) resource indicator) and the TPC command need to indicate their original meanings and cannot be reused). When the PDCCH skipping indication information requires a relatively large number of bits, in an extreme case (for example, when lengths of many fields in the DCI all are 0 due to configuration of the network device), a number of available bits that can be provided in Method 1 may be insufficient. However, in this case, Method 2 can well meet a requirement in a case in which the PDCCH skipping indication information requires a relatively large number of bits.

In other words, a number of remaining bits in the DCI is relatively small other than the first-type field, and a number of available bits in Method 1 is relatively small. However, Method 2 may have more available bits than Method 1, and is easier to implement.

Method 3: CA is not configured for the terminal device, and the specific field may have the following two manners.

Figure 8:
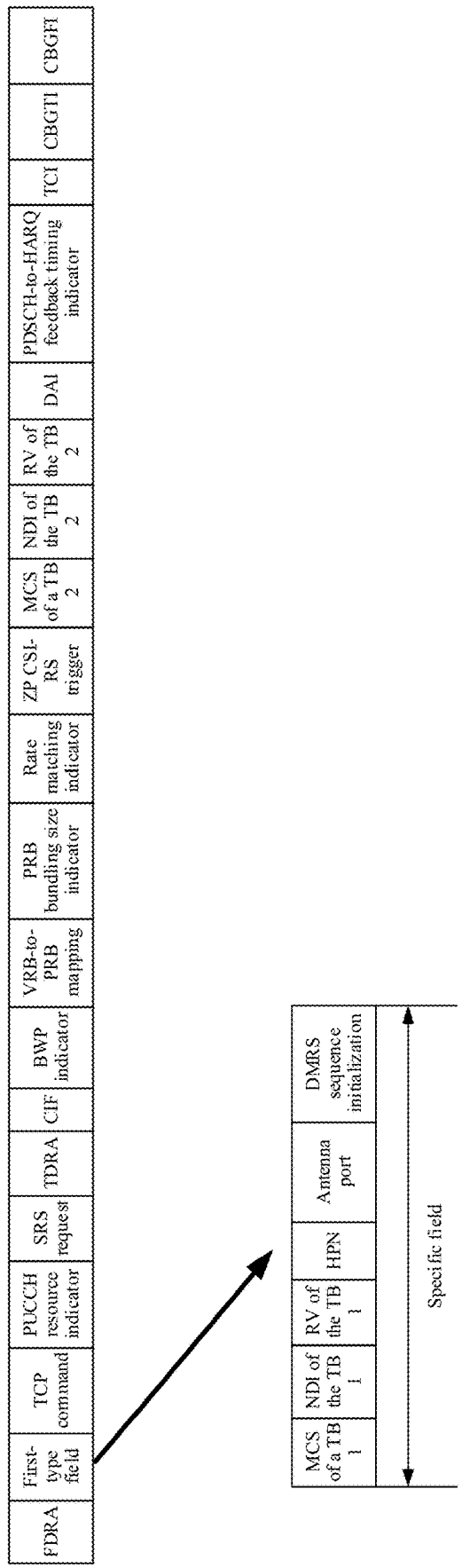
FIG. 8 is a schematic diagram of another type of DCI according to this application.

Manner 1: The specific field may include at least one of first-type fields in the DCI. For fields included in the first-type field, refer to the description of the first-type field in the foregoing DCI. The fields are not listed one by one herein. For example, when Manner 1 is used, an example of the DCI may be shown in FIG. 8.

Manner 2: The specific field may include at least one field other than an FDRA field in the DCI.

Figure 9:
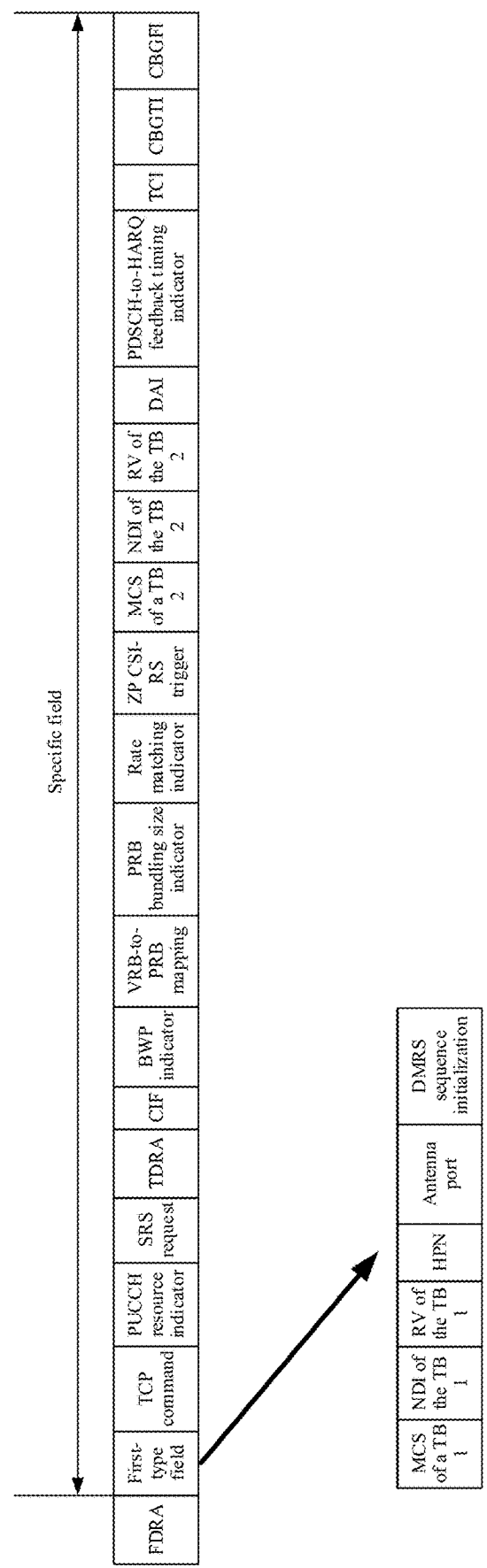
FIG. 9 is a schematic diagram of another type of DCI according to this application.

Specifically, for the case in which the specific field includes at least one field other than the FDRA field in the DCI, refer to the related description in Manner 2 in Method 2. Fields are not listed one by one herein. For example, when Manner 2 is used, an example of the DCI may be shown in FIG. 9.

In this method, CA is not configured for the terminal device, that is, no secondary cell is configured for the terminal device is. In other words, the terminal device is not indicated to perform the dormancy behavior on the secondary cell. Therefore, the first-type field may be directly used to indicate the PDCCH skipping indication information.

Figure 10:
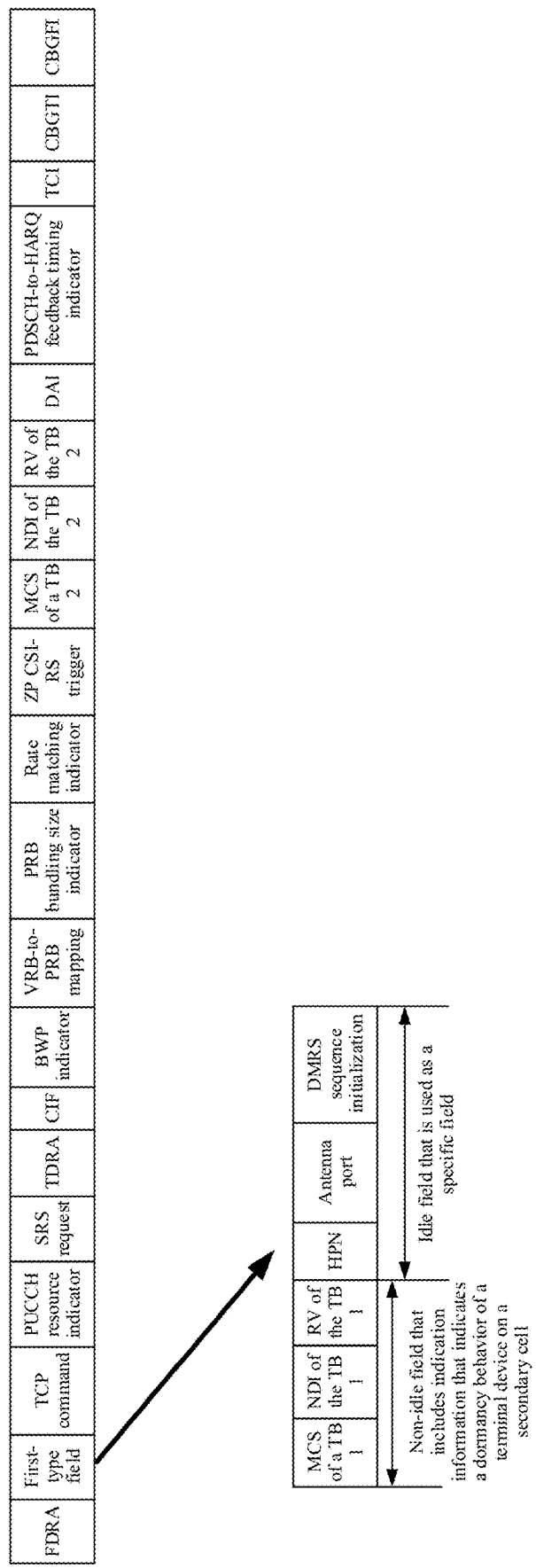
FIG. 10 is a schematic diagram of another type of DCI according to this application.

Method 4: The specific field may include an idle field in a first-type field. The first-type field is a defined field that indicates a dormancy behavior of the terminal device on a secondary cell, and a non-idle field in the first-type field includes indication information that indicates the dormancy behavior of the terminal device on the secondary cell. For fields included in the first-type field, refer to the description of the first-type field in the foregoing DCI. The fields are not listed one by one herein. For example, an example of the DCI may be shown in FIG. 10. It should be noted that FIG. 10 is merely an example, and division of the non-idle field and the idle field may include other cases, which are not listed one by one herein.

A length of a bit included in the non-idle field is equal to a number of secondary cells or a number of secondary cell groups that are configured for the terminal device, or the length of the bit included in the non-idle field is equal to a number of activated secondary cells or a number of activated secondary cell groups of the terminal device, and each bit indicates the dormancy behavior on a secondary cell or secondary cell group.

Specifically, currently, a specific number of bits used to indicate the dormancy behavior is determined based on a number of secondary cells (secondary carriers) or a number of secondary cell groups (secondary carrier wave groups) that are configured for the terminal device. To be specific, when a cell is used as a unit for indication, if six secondary cells are configured for the terminal device, 6 bits are used to indicate the dormancy behavior on the six secondary cells. Alternatively, when a cell group is used as a unit for indication, if two secondary cell groups are configured for the terminal device, 2 bits are used to indicate the dormancy behavior in the two secondary cell groups. However, in existing signaling, indication space is reserved based on a maximum number of bits (15 bits). Therefore, in some configuration cases, an indication of the dormancy behavior of the terminal device cannot fully occupy the following fields (that is, the first-type field): the MCS of the TB 1, the NDI of the TB 1, the RV of the TB 1, the HPN, the antenna port, and the DMRS sequence initialization. Therefore, a redundant bit or a redundant bit combination in these fields may be used to further indicate the PDCCH skipping indication information.

For example, there are a total of 16 bits in the following fields: the MCS of the TB 1, the NDI of the TB 1, the RV of the TB 1, the HPN, the antenna port, and the DMRS sequence initialization. If 10 secondary cells are configured for the terminal device, 10 bits may be used to indicate the dormancy behavior on the 10 secondary cells, and the remaining 6 bits are used to indicate the PDCCH skipping indication information.

For another example, there are a total of 16 bits in the following fields: the MCS of the TB 1, the NDI of the TB 1, the RV of the TB 1, the HPN, the antenna port, and the DMRS sequence initialization. 10 secondary cells are configured for the terminal device, but only five secondary cells are currently activated. When the secondary cell is not activated, the terminal device does not monitor the PDCCH on the secondary cell. Therefore, only the dormancy behavior on the activated secondary cell is indicated. In this case, 5 bits may be used to indicate the dormancy behavior on the five activated secondary cells, and the remaining 11 bits are used to indicate the PDCCH skipping information.

It should be noted that the secondary cell of the terminal device is preconfigured by the network device. Further, the network device pre-indicates a configured secondary cell that is activated, and the terminal device pre-learns of a situation of the secondary cell.

In Method 4, a redundant bit of the dormancy behavior indication may be fully used at the same time, and same DCI may be used to simultaneously indicate the dormancy behavior and the PDCCH skipping indication information.

In an embodiment, the PDCCH skipping indication information may indicate the terminal device to skip the PDCCH or not to skip the PDCCH. In another optional implementation, the PDCCH skipping indication information may indicate detailed information of PDCCH skipping.

In an embodiment, when the PDCCH skipping indication information can indicate the detailed information of PDCCH skipping, the PDCCH skipping indication information may include at least one of the following information: the first time interval in which the PDCCH is skipped, frequency domain resource information of some or all PDCCHs that are not monitored, radio network temporary identifier (RNTI) information of some or all PDCCHs that are not monitored, formats of some or all PDCCHs that are not monitored, or searching space of some or all PDCCHs that are not monitored.

In an embodiment, the first time interval may be referred to as skipping duration, that is, time length during which the PDCCH does not need to be monitored, which may be several slots, several subframes, several milliseconds, several PDCCH monitoring occasions, or the like. The first time interval may be determined based on an indication in the DCI. For example, the first time interval may correspond to one of a plurality of types of skipping duration that can be indicated by the DCI, for example, one type of skipping duration in the following Table 1 and Table 2. Alternatively, the first time interval may be determined based on configuration of the network device, for example, a type of PDCCH skipping duration configured by the network device. For example, 0 indicates skipping, and 1 indicates not skipping; or 0 indicates not skipping, and 1 indicates skipping, or another case exists. After receiving the PDCCH skipping indication information, the terminal device reads the first time interval, and no longer monitors the PDCCH in the first time interval.

For example, when any of the foregoing four methods is used for specific implementation, and when the specific field includes a plurality of fields, the plurality of fields may be cascaded as indication bits to indicate specific information of PDCCH skipping. To be specific, bits of the plurality of fields are combined as indication bits, and the indication bits are used to indicate the PDCCH skipping indication information. For example, when the specific field includes the SRS request and the CIF, bits respectively included in the SRS request and the CIF may be combined to jointly include the PDCCH skipping indication information.

How a bit of a single field or combined bits are used for indication may be configured by the network device for different terminal devices, or may be predefined in a standard. For example, when Method 1 is used, and when the specific field is the SRS request, if the SRS request has 3 bits, M cases that are configured by the network device or predefined may be indicated, where M is less than or equal to 8. For example, when a time length of the first time interval (that is, the skipping duration) in which the PDCCH is skipped is indicated by using the specific field, a specific indication may be shown in the following Table 1 or the following Table 2.

TABLE 1

| Bit information | Meaning |
|---|---|
| 000 | Directly ending a current discontinuous reception cycle ((discontinuous reception, DRX) cycle) |
| 001 | Skipping one slot (slot) |
| 010 | Skipping two slots |
| 011 | Skipping three slots |
| 100 | Skipping four slots |
| 101 | Skipping five slots |
| 110 | Skipping six slots |
| 111 | Skipping seven slots |

TABLE 2

| Bit information | Meaning |
|---|---|
| 000 | Directly ending a current DRX cycle |
| 001 | Skipping one monitoring occasion |
| 010 | Skipping two monitoring occasions |
| 011 | Skipping three monitoring occasions |
| 100 | Skipping four monitoring occasions |
| 101 | Skipping five monitoring occasions |
| 110 | Skipping six monitoring occasions |
| 111 | Skipping seven monitoring occasions |

In Table 1, "directly ending a current discontinuous reception cycle" means that when discontinuous reception (DRX) is configured for UE, the UE does not monitor the PDCCH in the current discontinuous reception cycle, and does not start to monitor the PDCCH again until a next discontinuous reception cycle. "Skipping several slots" means that the first time interval is several slots, and the PDCCH is not monitored in the several slots. For example, in Table 1, when the 3 bits of the SRS request field in the specific field are "001", it indicates that the first time interval is one slot; or when the 3 bits are "101", it indicates that the first time interval is six slots. For other cases, refer to cases listed in Table 1, which are not described one by one herein.

In Table 2, "directly ending a current discontinuous reception cycle" means that when discontinuous reception (DRX) is configured for UE, the UE does not monitor the PDCCH in the current discontinuous reception cycle, and does not start to monitor the PDCCH again until a next discontinuous reception cycle. "Skipping several monitoring occasions" means that the first time interval is several monitoring occasions, and the PDCCH is not monitored in the several monitoring occasions. The monitoring occasion is a time location that is determined by using research space configured for the UE and at which the PDCCH needs to be monitored. For another example, in Table 2, when the 3 bits of the SRS request field in the specific field are "010", it indicates that the first time interval is two monitoring occasions; or when the 3 bits are "100", it indicates that the first time interval is four monitoring occasions. For other cases, refer to cases listed in Table 2, which are not described one by one herein.

It should be noted that the cases in the two tables are merely examples, and there may be other cases, which are not listed one by one herein in this application.

In an embodiment, when indicating the frequency domain resource information of some or all PDCCHs that are not monitored, the PDCCH skipping indication information may indicate a specific cell or cell group on which PDCCH monitoring is skipped. Specifically, PDCCH monitoring skipping indicated by the PDCCH skipping indication information is performed at least for a primary cell of the terminal device, that is, the PDCCH skipping indication information may indicate not to monitor a PDCCH on a primary cell, or may indicate not to monitor PDCCHs on a primary cell and a secondary cell. Specifically, the frequency domain resource information of some or all PDCCHs that are not monitored includes: a primary cell on which some or all PDCCHs are not monitored, or a primary cell and a secondary cell on which some or all PDCCHs are not monitored. In Method 3, the frequency domain resource information of some or all PDCCHs that are not monitored includes only the primary cell on which some or all PDCCHs are not monitored. In Method 1, Method 2, and Method 4, the frequency domain resource information of some or all PDCCHs that are not monitored includes the primary cell and the secondary cell on which some or all PDCCHs are not monitored.

For example, when the frequency domain resource information of some or all PDCCHs that are not monitored includes the primary cell and the secondary cell on which some or all PDCCHs are not monitored, the PDCCH skipping indication information may include a plurality of bits, and the plurality of bits indicate the primary cell and secondary cell on which some or all PDCCHs are not monitored. The plurality of bits include a first bit and a second bit, the first bit indicates a first cell or a first cell group on which some or all PDCCHs are not monitored, and the second bit indicates a second cell or a second cell group on which some or all PDCCHs are not monitored.

Specifically, the first bit may include one or more bits, and the second bit may also include one or more bits. The first bit has an indication correspondence with the first cell or the first cell group, and the second bit has an indication correspondence with the second cell or the second cell group. For example, 1 bit indicates all cells or cell groups. For another example, each bit indicates one cell or cell group, and a bit length is equal to a number of cells or a number of cell groups. For another example, one cell indicates a plurality of cells or cell groups, but different bits indicate different cells or cell groups. For example, a bit 1 indicates a cell 1 and a cell 2, and a bit 2 indicates a cell 3, a cell 4, and a cell 5. Certainly, there may be a plurality of other possibilities, which are not listed one by one herein. The correspondence may be preconfigured by the network device or may be predefined by using a standard. When being preconfigured by the network device, the correspondence may be included in corresponding configuration information when the network device configures, for a terminal, a parameter related to PDCCH skipping. For example, the following signaling structure is used for configuration:

```
PDCCH-SkippingConfig::= {
    cellID-ListInEachGroup SEQUENCE (SIZE(1..maxNrofGroup))
    OF cellID-ListInOneGroup
}.
```

The foregoing means that configuration information in the PDCCH skipping indication information includes a parameter cellID-ListInEachGroup, and this parameter is an array and includes (maxNrofGroup) cellID-ListInOneGroups.

Specifically, the definition provided below is the cellID-ListInOneGroup. Each cellID-ListInOneGroup is an array and includes several servingCellIds.

```
cellID-ListInOneGroup:= SEQUENCE {
    servingCellId          ServCellIndex
}.
```

It should be understood that the plurality of bits may further include a bit other than the first bit and the second bit to indicate not to monitor some or all PDCCHs on another cell or another cell group. This is not limited in this application.

For example, when the plurality of bits indicate the primary cell and the secondary cell on which some or all PDCCHs are not monitored, assuming that 2 bits of the TPC command field and 3 bits of the PUCCH resource indicator field are used for indication, that is, a total of 5 bits are used for indication, a form of a bitmap may be used to indicate whether the PDCCH needs to be skipped on five cells or five cell groups. Alternatively, the 5 bits may be used to indicate whether the PDCCH needs to be skipped in ten cells or cell groups. For example, 2 bits in the 5 bits each may be used to indicate whether the PDCCH needs to be skipped on one cell or cell group, 2 bits in 3 bits other the 2 bits in the 5 bits each may be used to indicate whether the PDCCH needs to be skipped on two cells or cell groups, and the last remaining 1 bit may be used to indicate whether the PDCCH needs to be skipped on four cells or cell groups. Certainly, there are other cases, which are not listed one by one herein in this application. Skipping duration on each cell or cell group may be uniformly configured or may be separately configured. For example, when a length of the first time interval is configured by the network device, the skipping duration is configured per terminal device (that is, one parameter is configured for each UE), and is uniformly configured as five slots. In this case, when any cell or cell group is indicated that PDCCH skipping is required, five slots are skipped. Alternatively, the skipping duration is configured for each cell or cell group (that is, one parameter is configured for each cell or cell group). The skipping duration of a cell group 1 is 5 slots, and the skipping duration of a cell group 2 is 10 slots. In this case, when it is indicated that PDCCH skipping is required, the terminal device skips PDCCH monitoring for different duration in different cell groups.

Operation 202: The network device sends the DCI to the terminal device, so that the terminal device does not monitor the PDCCH in the first time interval.

Operation 203: The terminal device determines, based on the PDCCH skipping indication information, not to monitor the PDCCH in the first time interval.

According to the method for indicating to skip PDCCH monitoring provided in embodiments of this application, the network device generates the DCI, and enables the specific field in the DCI to include the PDCCH skipping indication information, where the PDCCH skipping indication information indicates the terminal device not to monitor the PDCCH in the first time interval, so that the terminal device determines, based on the PDCCH skipping indication information in the DCI, not to monitor the PDCCH in the first time interval. According to the foregoing method, the DCI is used to indicate the terminal device to skip PDCCH monitoring, and specific signaling used to indicate to skip PDCCH monitoring is clarified, thereby saving energy of the terminal device.

Figure 11:
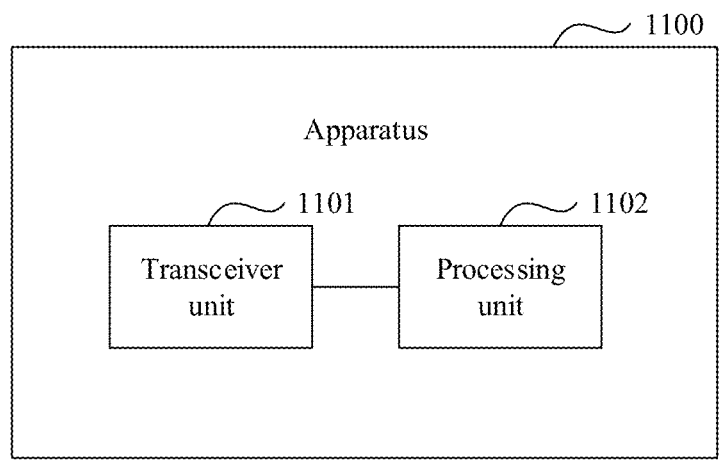
FIG. 11 is a schematic diagram of a structure of an apparatus according to this application.

Based on the foregoing embodiment, an embodiment of this application further provides an apparatus. As shown in FIG. 11, an apparatus 1100 may include a transceiver unit 1101 and a processing unit 1102. The transceiver unit 1101 is used by the apparatus 1100 to receive information (e.g., a message or data) or send information (e.g., a message or data), and the processing unit 1102 is configured to control and manage an action of the apparatus 1100. The processing unit 1102 may further control the transceiver unit 1101 to perform a operation.

For example, the apparatus 1100 may be the first device in the foregoing embodiment, and may be a terminal device, a processor in the terminal device, a chip or a chip system, a functional module, or the like. Alternatively, the apparatus 1100 may be the second device in the foregoing embodiment, and may be a network device, or a processor in the network device, a chip or a chip system, a functional module, or the like.

In one embodiment, when the apparatus 1100 is configured to implement a function of the terminal device in the embodiment shown in FIG. 2, the following operations may be included.

The transceiver unit 1101 is configured to receive DCI from a network device, where a specific field in the DCI includes PDCCH skipping indication information, and the PDCCH skipping indication information indicates the terminal device not to monitor a PDCCH in a first time interval.

The processing unit 1102 is configured to determine, based on the PDCCH skipping indication information, not to determine the PDCCH in the first time interval.

In an embodiment, when the apparatus 1100 is configured to implement a function of the network device in the embodiment shown in FIG. 2, the following operations may be included.

The processing unit 1102 is configured to generate DCI, where a specific field in the DCI includes PDCCH skipping indication information, and the PDCCH skipping indication information indicates a terminal device not to monitor a PDCCH in a first time interval.

The transceiver unit 1101 is configured to send the DCI to the terminal device, so that the terminal device does not monitor the PDCCH in the first time interval.

In an embodiment, the specific field in the DCI includes at least one of fields other than an FDRA field and a first-type field in the DCI. The first-type field is a defined field that indicates a dormancy behavior of the terminal device on a secondary cell, and the first-type field includes at least one of the following fields: an MCS of a TB 1, an NDI of the TB 1, an RV of the TB 1, a hybrid automatic repeat request process number (HPN), an antenna port, or DMRS sequence initialization.

In an embodiment, the specific field in the DCI includes at least one of the following fields: a TPC command, a PUCCH resource indicator, an SRS request, TDRA, a CIF, a BWP indicator, VRB-to-PRB mapping, a PRB bundling size indicator, a ZP CSI-RS trigger, an MCS of a transport block TB 2, an NDI of the TB 2, an RV of the TB 2, a DAI, a PDSCH-to-HARQ feedback timing indicator, a TCI, CBGTI, or CBGFI.

In an embodiment, the DCI further includes a flag bit. When the flag bit has a first value, the specific field in the DCI indicates the PDCCH skipping indication information. The flag bit is located in a field other than an FDRA field in the DCI.

The specific field includes at least one of first-type fields in the DCI, and the first-type field includes at least one of the following fields: an MCS of a TB 1, an NDI of the TB 1, an RV of the TB 1, a HPN, an antenna port, or DMRS sequence initialization; or the specific field includes at least one field other than the FDRA field in the DCI.

In an embodiment, carrier aggregation (CA) is not configured for the terminal device.

The specific field includes at least one of first-type fields in the DCI, and the first-type field includes at least one of the following fields: an MCS of a TB 1, an NDI of the TB 1, an RV of the TB 1, an HPN, an antenna port, or DMRS sequence initialization; or the specific field includes at least one field other than an FDRA field in the DCI.

In an embodiment, the specific field includes an idle field in a first-type field. The first-type field is a defined field that indicates a dormancy behavior of the terminal device on a secondary cell, and a non-idle field in the first-type field includes indication information that indicates the dormancy behavior of the terminal device on the secondary cell. The first-type field includes at least one of the following fields: an MCS of a TB 1, an NDI of the TB 1, an RV of the TB 1, an HPN, an antenna port, or DMRS sequence initialization.

In an embodiment, the PDCCH skipping indication information includes at least one of the following information: the first time interval in which the PDCCH is skipped, frequency domain resource information of some or all PDCCHs that are not monitored, RNTI information of some or all PDCCHs that are not monitored, formats of some or all PDCCHs that are not monitored, or searching space of some or all PDCCHs that are not monitored.

In an embodiment, the frequency domain resource information of some or all PDCCHs that are not monitored includes:

a primary cell on which some or all PDCCHs are not monitored, or a primary cell and a secondary cell on which some or all PDCCHs are not monitored.

In an embodiment, the frequency domain resource information of some or all PDCCHs that are not monitored includes the primary cell and the secondary cell on which some or all PDCCHs are not monitored, the PDCCH skipping indication information includes a plurality of bits, and the plurality of bits indicate the primary cell and the secondary cell on which some or all PDCCHs are not monitored. The plurality of bits include a first bit and a second bit, the first bit indicates a first cell or a first cell group on which some or all PDCCHs are not monitored, and the second bit indicates a second cell or a second cell group on which some or all PDCCHs are not monitored.

In an embodiment, the frequency domain resource allocation FDRA field in the DCI is preset to a specific value. When a frequency domain resource allocation type is a type 0, the specific value is a first value; or when the frequency domain resource allocation type is a type 1, the specific value is a second value.

It should be noted that, in embodiments of this application, division into the units is an example, and is merely logical function division. During actual implementation, another division manner may be used. Function units in embodiments of this application may be integrated into one processing unit, or each of the units may independently exist physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium, and includes several instructions for instructing a computer device (which may be a personal computer, a server, or a network device) or a processor to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

Figure 12:
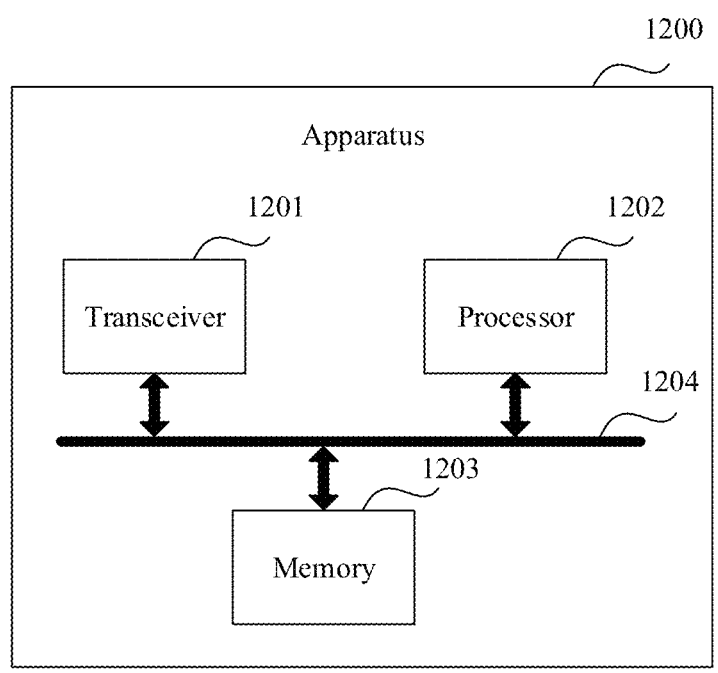
FIG. 12 is a diagram of a structure of an apparatus according to this application.

Based on the foregoing embodiment, an embodiment of this application further provides an apparatus. As shown in FIG. 12, an apparatus 1200 may include a transceiver 1201 and a processor 1202. Optionally, the apparatus 1200 may further include a memory 1203. The memory 1203 may be disposed inside the apparatus 1200 or may be disposed outside the apparatus 1200. The processor 1202 may control the transceiver 1201 to receive and send data.

Specifically, the processor 1202 may be a central processing unit (CPU), a network processor (NP), or a combination of a CPU and an NP. The processor 1202 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), generic array logic (GAL), or any combination thereof.

The transceiver 1201, the processor 1202, and the memory 1203 are connected to each other. Optionally, the transceiver 1201, the processor 1202, and the memory 1203 are connected to each other by using a bus 1204. The bus 1204 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 12, but this does not mean that there is only one bus or only one type of bus.

In an embodiment, the memory 1203 is configured to store a program and the like. Specifically, the program may include program code, and the program code includes computer operation instructions. The memory 1203 may include a RAM, and may further include a non-volatile memory, such as one or more disk memories. The processor 1202 executes the application program stored in the memory 1203 to implement the foregoing functions, to implement functions of the apparatus 1200.

For example, the apparatus 1200 may be a first device, and may be the terminal device in the foregoing embodiment; or the apparatus 1200 may be a second device, and may be the network device in the foregoing embodiment.

In one embodiment, when the apparatus 1200 is configured to implement a function of the terminal device in the embodiment shown in FIG. 2, the following operations may be included.

The transceiver 1201 is configured to receive downlink control information DCI from a network device, where a specific field in the DCI includes PDCCH skipping indication information, and the PDCCH skipping indication information indicates the terminal device not to monitor a PDCCH in a first time interval.

The processor 1202 is configured to determine, based on the PDCCH skipping indication information, not to determine the PDCCH in the first time interval.

In another embodiment, when the apparatus 1200 is configured to implement a function of the network device in the embodiment shown in FIG. 2, the following operations may be included.

The processor 1202 is configured to generate downlink control information DCI, where a specific field in the DCI includes PDCCH skipping indication information, and the PDCCH skipping indication information indicates a terminal device not to monitor a PDCCH in a first time interval.

The transceiver 1201 is configured to send the DCI to the terminal device, so that the terminal device does not monitor the PDCCH in the first time interval.

In an embodiment, the specific field in the DCI includes at least one of fields other than an FDRA field and a first-type field in the DCI. The first-type field is a defined field that indicates a dormancy behavior of the terminal device on a secondary cell, and the first-type field includes at least one of the following fields: a modulation and coding scheme MCS of a transport block TB 1, a new data indicator NDI of the TB 1, a redundancy version RV of the TB 1, an HPN, an antenna port, or DMRS sequence initialization.

In an embodiment, the specific field in the DCI includes at least one of the following fields: a TPC command, a PUCCH resource indicator, an SRS request, TDRA, a CIF, a BWP indicator, VRB-to-PRB mapping, a PRB bundling size indicator, a rate matching indicator, a ZP CSI-RS trigger, an MCS of a TB 2, an NDI of the TB 2, an RV of the TB 2, a DAI, a PDSCH-to-HARQ feedback timing indicator, a TCI, CBGTI, or CBGFI.

In an embodiment, the DCI further includes a flag bit. When the flag bit has a first value, the specific field in the DCI indicates the PDCCH skipping indication information. The flag bit is located in a field other than an FDRA field in the DCI.

The specific field includes at least one of first-type fields in the DCI, and the first-type field includes at least one of the following fields: an MCS of a TB 1, an NDI of the TB 1, an RV of the TB 1, an HPN, an antenna port, or DMRS sequence initialization; or the specific field includes at least one field other than the FDRA field in the DCI.

In an embodiment, CA is not configured for the terminal device.

The specific field includes at least one of first-type fields in the DCI, and the first-type field includes at least one of the following fields: an MCS of a TB 1, an NDI of the TB 1, an RV of the TB 1, an HPN, an antenna port, or DMRS sequence initialization; or the specific field includes at least one field other than an FDRA field in the DCI.

In an embodiment, the specific field includes an idle field in a first-type field. The first-type field is a defined field that indicates a dormancy behavior of the terminal device on a secondary cell, and a non-idle field in the first-type field includes indication information that indicates the dormancy behavior of the terminal device on the secondary cell. The first-type field includes at least one of the following fields: an MCS of a transport block TB 1, an NDI of the TB 1, an RV of the TB 1, an HPN, an antenna port, or DMRS sequence initialization.

In an embodiment, the PDCCH skipping indication information includes at least one of the following information: the first time interval in which the PDCCH is skipped, frequency domain resource information of some or all PDCCHs that are not monitored, RNTI information of some or all PDCCHs that are not monitored, formats of some or all PDCCHs that are not monitored, or searching space of some or all PDCCHs that are not monitored.

In an embodiment, the frequency domain resource information of some or all PDCCHs that are not monitored includes:
a primary cell on which some or all PDCCHs are not monitored, or a primary cell and a secondary cell on which some or all PDCCHs are not monitored.

In an embodiment, the frequency domain resource information of some or all PDCCHs that are not monitored includes the primary cell and the secondary cell on which some or all PDCCHs are not monitored, the PDCCH skipping indication information includes a plurality of bits, and the plurality of bits indicate the primary cell and the secondary cell on which some or all PDCCHs are not monitored. The plurality of bits include a first bit and a second bit, the first bit indicates a first cell or a first cell group on which some or all PDCCHs are not monitored, and the second bit indicates a second cell or a second cell group on which some or all PDCCHs are not monitored.

In an embodiment, the FDRA field in the DCI is preset to a specific value. When a frequency domain resource allocation type is a type 0, the specific value is a first value; or when the frequency domain resource allocation type is a type 1, the specific value is a second value.

Based on the foregoing embodiment, an embodiment of this application provides a communications system. The communications system may include the terminal device, the network device, and the like in the foregoing embodiment.

An embodiment of this application further provides a computer-readable storage medium. The computer-readable storage medium is configured to store a computer program. When the computer program is executed by a computer, the computer may implement the method for indicating to skip PDCCH monitoring provided in the foregoing method embodiment.

An embodiment of this application further provides a computer program product. The computer program product is configured to store a computer program. When the computer program is executed by a computer, the computer may implement the method for indicating to skip PDCCH monitoring provided in the foregoing method embodiment.

An embodiment of this application further provides a chip. The chip is coupled to a memory, and the chip is configured to implement the method for indicating to skip PDCCH monitoring provided in the foregoing method embodiment. A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and operations are performed on the computer or the another programmable device, so that computer-implemented processing is generated. Therefore, the instructions executed on the computer or the another programmable device provide operations for implementing a specific function in one or more procedures in the flowcharts and/or in one or more blocks in the block diagrams.

Certainly, a person skilled in the art can make various modifications and variations to this application without departing from the protection scope of this application. This application is intended to cover these modifications and variations of this application provided that they fall within the scope of protection defined by the following claims and their equivalent technologies.

What is claimed is:

1. A method for indicating to skip physical downlink control channel (PDCCH) monitoring performed by a first device, the method comprising:
   receiving downlink control information (DCI) from a network device, wherein
      the DCI comprises at least a specific field, a first-type field, and a flag bit;
   the specific field in the DCI comprises PDCCH skipping indication information that indicates a terminal device not to monitor a PDCCH in a first time interval; and
   when the flag bit is a second value, the first-type field indicates a dormancy behavior of the terminal device on a secondary cell; and
   determining, based on the PDCCH skipping indication information, not to monitor the PDCCH in the first time interval.

2. The method according to claim 1, wherein the specific field in the DCI comprises at least one of fields other than a frequency domain resource allocation (FDRA) field, and wherein the first-type field comprises at least one of the following fields: a modulation and coding scheme (MCS) of a transport block (TB) 1, a new data indicator (NDI) of the TB 1, a redundancy version (RV) of the TB 1, a hybrid automatic repeat request process number (HPN), an antenna port, or demodulation reference signal (DMRS) sequence initialization.

3. The method according to claim 2, wherein the specific field in the DCI comprises at least one of the following fields: a transmit power control (TPC) command, a physical uplink control channel (PUCCH) resource indicator, a sounding reference signal (SRS) request, time domain resource allocation (TDRA), a carrier indicator field (CIF), a bandwidth part (BWP) indicator, virtual resource block (VRB)-to-physical resource block (PRB) mapping, a physical resource block (PRB) bundling size indicator, a rate matching indicator, a zero power channel state information-reference signal (ZP CSI-RS) trigger, an MCS of a TB 2, a new data indicator (NDI) of the TB 2, an RV of the TB 2, a downlink assignment index (DAI), a physical downlink shared channel (PDSCH)-to-hybrid automatic repeat request (HARQ) feedback timing indicator, a transmission configuration indicator (TCI), code block group transmission information (CBGTI), or code block group flushing out information (CBGFI).

4. The method according to claim 2, wherein the PDCCH skipping indication information comprises at least one of the following information: the first time interval in which the PDCCH is skipped, frequency domain resource information of some or all PDCCHs that are not monitored, radio network temporary identifier (RNTI) information of some or all PDCCHs that are not monitored, formats of some or all PDCCHs that are not monitored, or searching space of some or all PDCCHs that are not monitored.

5. A method for indicating to skip physical downlink control channel (PDCCH) monitoring, the method comprising:
   generating downlink control information (DCI), wherein the DCI comprises at least a specific field, a first-type field, and a flag bit;
   the specific field in the DCI comprises PDCCH skipping indication information that indicates a terminal device not to monitor a PDCCH in a first time interval; and
   when the flag bit is a second value, the first-type field indicates a dormancy behavior of the terminal device on a secondary cell; and
   sending the DCI to the terminal device to signal to the terminal device to not monitor the PDCCH in the first time interval.

6. The method according to claim 5, wherein the specific field in the DCI comprises at least one of fields other than a frequency domain resource allocation (FDRA) field, and wherein the first-type field comprises at least one of the following fields: a modulation and coding scheme (MCS) of a transport block (TB) 1, a new data indicator (NDI) of the TB 1, a redundancy version (RV) of the TB 1, a hybrid automatic repeat request process number (HPN), an antenna port, or demodulation reference signal (DMRS) sequence initialization.

7. The method according to claim 6, wherein the specific field in the DCI comprises at least one of the following fields: a transmit power control (TPC) command, a physical uplink control channel (PUCCH) resource indicator, a sounding reference signal (SRS) request, time domain resource allocation (TDRA), a carrier indicator field (CIF), a bandwidth part (BWP) indicator, virtual resource block (VRB)-to-physical resource block (PRB) mapping, a physical resource block (PRB) bundling size indicator, a rate matching indicator, a zero power channel state information-reference signal (ZP CSI-RS) trigger, a modulation and coding scheme (MCS) of a transport block (TB) 2, a new data indicator (NDI) of the TB 2, a redundancy version (RV) of the TB 2, a downlink assignment index (DAI), a physical downlink shared channel (PDSCH)-to-hybrid automatic repeat request (HARQ) feedback timing indicator, a transmission configuration indicator (TCI), code block group transmission information (CBGTI), or code block group flushing out information (CBGFI).

8. A first device, comprising:
   a transceiver, configured to receive downlink control information (DCI) from a network device, wherein the DCI comprises at least a specific field, a first-type field, and a flag bit;

the specific field in the DCI comprises physical downlink control channel (PDCCH) skipping indication information that indicates a terminal device not to monitor a PDCCH in a first time interval; and when the flag bit is a second value, the first-type field indicates a dormancy behavior of the terminal device on a secondary cell; and a processor, configured to determine, based on the PDCCH skipping indication information, not to monitor the PDCCH in the first time interval.

9. The device according to claim 8, wherein the specific field in the DCI comprises at least one of fields other than a frequency domain resource allocation (FDRA) field, and wherein the first-type field comprises at least one of the following fields: a modulation and coding scheme (MCS) of a transport block (TB) 1, a new data indicator (NDI) of the TB 1, a redundancy version (RV) of the TB 1, a hybrid automatic repeat request process number (HPN), an antenna port, or demodulation reference signal (DMRS) sequence initialization.

10. The device according to claim 9, wherein the specific field in the DCI comprises at least one of the following fields: a transmit power control (TPC) command, a physical uplink control channel (PUCCH) resource indicator, a sounding reference signal (SRS) request, time domain resource allocation (TDRA), a carrier indicator field (CIF), a bandwidth part (BWP) indicator, virtual resource block (VRB)-to-physical resource block (PRB) mapping, a physical resource block (PRB) bundling size indicator, a rate matching indicator, a zero power channel state information-reference signal (ZP CSI-RS) trigger, a modulation and coding scheme (MCS) of a transport block (TB) 2, a new data indicator (NDI) of the TB 2, a redundancy version (RV) of the TB 2, a downlink assignment index (DAI), a physical downlink shared channel (PDSCH)-to-hybrid automatic repeat request (HARQ) feedback timing indicator, a transmission configuration indicator (TCI), code block group transmission information (CBGTI), or code block group flushing out information (CBGFI).

11. A device, comprising:

a processor, configured to generate downlink control information (DCI), wherein the DCI comprises at least a specific field, a first-type field, and a flag bit;

the specific field in the DCI comprises physical downlink control channel (PDCCH) skipping indication information that indicates a terminal device not to monitor a PDCCH in a first time interval; and when the flag bit is a second value, the first-type field indicates a dormancy behavior of the terminal device on a secondary cell; and a transceiver, configured to send the DCI to the terminal device to signal to the terminal device to not monitor the PDCCH in the first time interval.

12. The device according to claim 11, wherein the specific field in the DCI comprises at least one of fields other than a frequency domain resource allocation (FDRA) field, and the first-type field comprises at least one of the following fields: a modulation and coding scheme (MCS) of a transport block (TB) 1, a new data indicator (NDI) of the TB 1, a redundancy version (RV) of the TB 1, a hybrid automatic repeat request process number (HPN), an antenna port, or demodulation reference signal (DMRS) sequence initialization.

13. The device according to claim 12, wherein the specific field in the DCI comprises at least one of the following fields: a transmit power control (TPC) command, a physical uplink control channel (PUCCH) resource indicator, a sounding reference signal (SRS) request, time domain resource allocation (TDRA), a carrier indicator field (CIF), a bandwidth part (BWP) indicator, virtual resource block (VRB)-to-physical resource block (PRB) mapping, a physical resource block (PRB) bundling size indicator, a rate matching indicator, a zero power channel state information-reference signal (ZP CSI-RS) trigger, a modulation and coding scheme (MCS) of a transport block (TB) 2, a new data indicator (NDI) of the TB 2, a redundancy version (RV) of the TB 2, a downlink assignment index (DAI), a physical downlink shared channel (PDSCH)-to-hybrid automatic repeat request (HARQ) feedback timing indicator, a transmission configuration indicator (TCI), code block group transmission information (CBGTI), or code block group flushing out information (CBGFI).

14. A non-transitory computer-readable storage medium, comprising instructions, wherein when the instructions are executed on a computer, the computer is enabled to perform the method according to claim 1.

15. A non-transitory computer program product comprising instructions, wherein when the computer program product is executed on a computer, the computer is enabled to perform the method according to any one of claim 5.

16. A chip, wherein the chip is coupled to a memory, and the chip is configured to perform the method according to claim 1.

17. A chip, wherein the chip is coupled to a memory, and the chip is configured to perform the method according to claim 5.

* * * * *